(12) United States Patent
Kitanaka

(10) Patent No.: US 12,231,006 B2
(45) Date of Patent: Feb. 18, 2025

(54) DRIVE CONTROL DEVICE FOR ELECTRIC VEHICLE

(71) Applicant: Mitsubishi Electric Corporation, Tokyo (JP)

(72) Inventor: Hidetoshi Kitanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 308 days.

(21) Appl. No.: 17/759,439

(22) PCT Filed: Jan. 27, 2020

(86) PCT No.: PCT/JP2020/002750
§ 371 (c)(1),
(2) Date: Jul. 26, 2022

(87) PCT Pub. No.: WO2021/152657
PCT Pub. Date: Aug. 5, 2021

(65) Prior Publication Data
US 2023/0085115 A1    Mar. 16, 2023

(51) Int. Cl.
*H02K 11/33* (2016.01)
*H02K 5/20* (2006.01)
*H02K 9/02* (2006.01)
*H02K 11/215* (2016.01)

(52) U.S. Cl.
CPC .............. *H02K 11/33* (2016.01); *H02K 5/203* (2021.01); *H02K 9/02* (2013.01); *H02K 11/215* (2016.01)

(58) Field of Classification Search
CPC .................................. H02K 5/22; H02K 5/225
USPC ............................................................ 310/400
See application file for complete search history.

(56) References Cited

U.S. PATENT DOCUMENTS

| | | | | |
|---|---|---|---|---|
| 7,652,902 B2 * | 1/2010 | Hattori | ................. | H05K 7/1432 |
| | | | | 363/145 |
| 8,710,705 B2 * | 4/2014 | Yamasaki | .............. | H02K 9/227 |
| | | | | 310/68 B |
| 8,957,557 B2 * | 2/2015 | Yamasaki | .............. | H02K 9/227 |
| | | | | 310/72 |

(Continued)

FOREIGN PATENT DOCUMENTS

| | | | | |
|---|---|---|---|---|
| CN | 102570694 A | * | 7/2012 | .......... B62D 5/0406 |
| EP | 0456169 B1 | * | 3/1995 | |

(Continued)

OTHER PUBLICATIONS

Office Action issued in corresponding Indian Patent Application No. 202227042545, dated Nov. 3, 2022, 5 pages.

(Continued)

*Primary Examiner* — Robert W Horn
(74) *Attorney, Agent, or Firm* — BUCHANAN, INGERSOLL & ROONEY PC

(57) ABSTRACT

A drive control device for electric vehicle includes a motor part, and a converter part that controls driving of the motor part. The motor part includes a motor frame made of metal and accommodating a stator and a rotor. The motor part has an outer circumferential face. The converter part is disposed around the motor frame. The converter part includes a semiconductor module including a semiconductor element. The semiconductor module is directly or thermally in contact with the outer circumferential face of the motor frame.

19 Claims, 13 Drawing Sheets

(56) References Cited

U.S. PATENT DOCUMENTS

| | | | |
|---|---|---|---|
| 9,920,571 B2* | 3/2018 | Smith | H02P 31/00 |
| 10,903,776 B2* | 1/2021 | Cairoli | H02P 29/032 |
| 2008/0116838 A1* | 5/2008 | Hattori | F04B 39/121 |
| | | | 318/722 |
| 2008/0205107 A1* | 8/2008 | Hattori | H05K 7/1432 |
| | | | 29/854 |
| 2010/0028173 A1* | 2/2010 | Ichise | F04B 39/066 |
| | | | 417/371 |
| 2011/0066332 A1 | 3/2011 | Sonoda et al. | |
| 2011/0189035 A1* | 8/2011 | Nakagami | F04C 29/047 |
| | | | 62/505 |
| 2013/0119834 A1* | 5/2013 | Nakagami | H02K 11/05 |
| | | | 310/68 D |
| 2015/0077034 A1 | 3/2015 | Kaneko et al. | |
| 2022/0247276 A1* | 8/2022 | Antunes Cezario | H02K 9/06 |
| 2023/0085115 A1* | 3/2023 | Kitanaka | H02K 9/02 |
| | | | 310/71 |

FOREIGN PATENT DOCUMENTS

| | | | | |
|---|---|---|---|---|
| EP | 3151394 A1 * | 4/2017 | | H02H 7/085 |
| EP | 3929447 A1 * | 12/2021 | | F04D 13/0686 |
| JP | H08336261 A | 12/1996 | | |
| JP | H10322973 A | 12/1998 | | |
| JP | 2003088045 A | 3/2003 | | |
| JP | 2004312960 A | 11/2004 | | |
| JP | 2008125221 A | 5/2008 | | |
| JP | 2010057266 A * | 3/2010 | | |
| JP | 2012055117 A | 3/2012 | | |
| WO | 2010007672 A1 | 1/2010 | | |
| WO | 2013160988 A1 | 10/2013 | | |
| WO | WO-2015181868 A1 * | 12/2015 | | H02H 7/085 |
| WO | WO-2024009372 A1 * | 1/2024 | | |

OTHER PUBLICATIONS

International Search Report (PCT/ISA/210) with English translation and Written Opinion (PCT/ISA/237) mailed on Apr. 7, 2020, by the Japan Patent Office as the International Searching Authority for International Application No. PCT/JP2020/002750.

Notification of Reason for Refusal issued in corresponding Japanese Patent Application No. 2021-573633 dated Mar. 29, 2022, 7 pages.

* cited by examiner

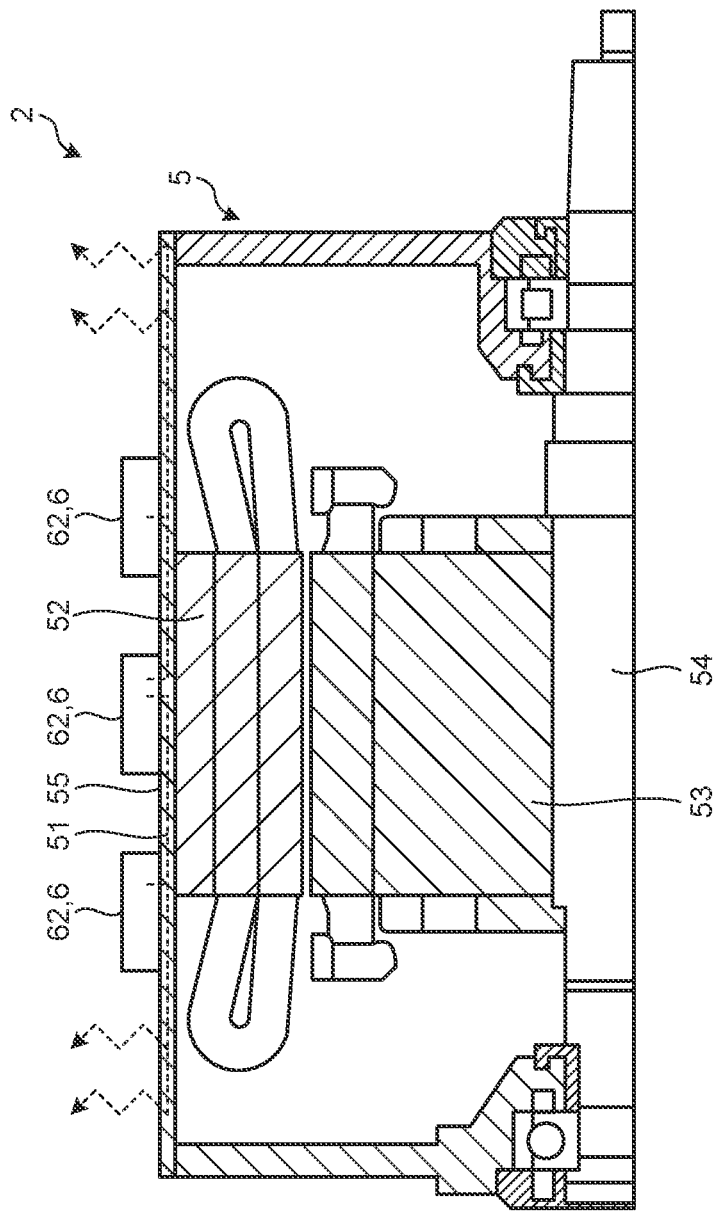

DRIVE CONTROL DEVICE FOR ELECTRIC VEHICLE

FIELD

The present invention relates to a drive control device, which has a function of cooling an inverter, for electric vehicle.

BACKGROUND

Drive control devices for supplying power to motors have been mounted on electric vehicle. A drive control device includes a reactor, a capacitor, an inverter, and the like. The inverter converts direct-current power received from an overhead power line into alternating-current power, and supplies the alternating-current power obtained by the conversion to a motor.

Typically, a reactor, a capacitor, an inverter, a cooling device for cooling these components, and the like are accommodated in one housing and disposed on the roof or under the floor of electric vehicle on the other hand, a motor is disposed on a truck installed under the floor of a car.

Because a large number of devices, in addition to inverters and the like, are disposed on the roof and under the floor of electric vehicle, the space for installation of the housing may be constrained in relation to other devices. In such a case, the specification of the drive control device needs to be changed to reduce the sizes of the components of the drive control device and the housing. As a result of the change in the specification of the drive control device, however, the performance of the electric vehicle may be lowered than that before the change in the specification.

Patent Literature 1 describes an inverter-integrated motor including an inverter, which is, however, not to be used for a motor of electric vehicle. If an inverter-integrated motor can be used for a motor of electric vehicle, an inverter and a motor can be disposed together on a truck, the space that has been occupied by the inverter in the housing thus becomes unoccupied, and the housing can be reduced in size accordingly. Because this can achieve reduction in size of the housing without changing the specification of the drive control device, there have been demands for development of inverter-integrated motors to be used for motors of electric vehicle.

In an inverter-integrated motor, release of heat produced by an inverter is a problem, and measures for cooling the inverter need to be taken. According to the technology described in Patent Literature 1, cooling means for cooling the inverter is mounted.

CITATION LIST

Patent Literature

Patent Literature 1: Japanese Patent Application Laid-open No. 2004-312960

SUMMARY

Technical Problem

With the technology described in Patent Literature 1, however, cooling means for cooling the inverter is necessary in addition to cooling means for cooling a stator, a rotor, and the like, which is problematic in that the inverter-integrated motor is increased in size.

The present invention has been made in view of the above, and an object thereof is to provide a drive control device for electric vehicle capable of reducing the size of an inverter-integrated motor while ensuring the function of cooling an inverter.

Solution to Problem

A drive control device for electric vehicle according to an aspect of the present invention includes a motor part, and a converter part that controls driving of the motor part. The motor part includes a motor frame made of metal and accommodating a stator and a rotor. The motor frame has an outer circumferential face. The converter part is disposed around the motor frame. The converter part includes a semiconductor module including a semiconductor element. The semiconductor module is directly or thermally in contact with the outer circumferential face of the motor frame.

Advantageous Effects of Invention

According to the present invention, the effect of enabling the inverter-integrated motor to be reduced in size while ensuring the function of cooling the inverter is produced.

BRIEF DESCRIPTION OF DRAWINGS

FIG. 14 is a cross-sectional view illustrating a converter part and a motor part of a drive control device for electric vehicle according to an eighth embodiment of the present invention, corresponding to a cross-sectional view along line VI-VI illustrated in FIG. 5.

DESCRIPTION OF EMBODIMENTS

A drive control device for electric vehicle according to certain embodiments of the present invention will be described in detail below with reference to the drawings. Note that the present invention is not limited to the embodiments.

First Embodiment

Figure 1:
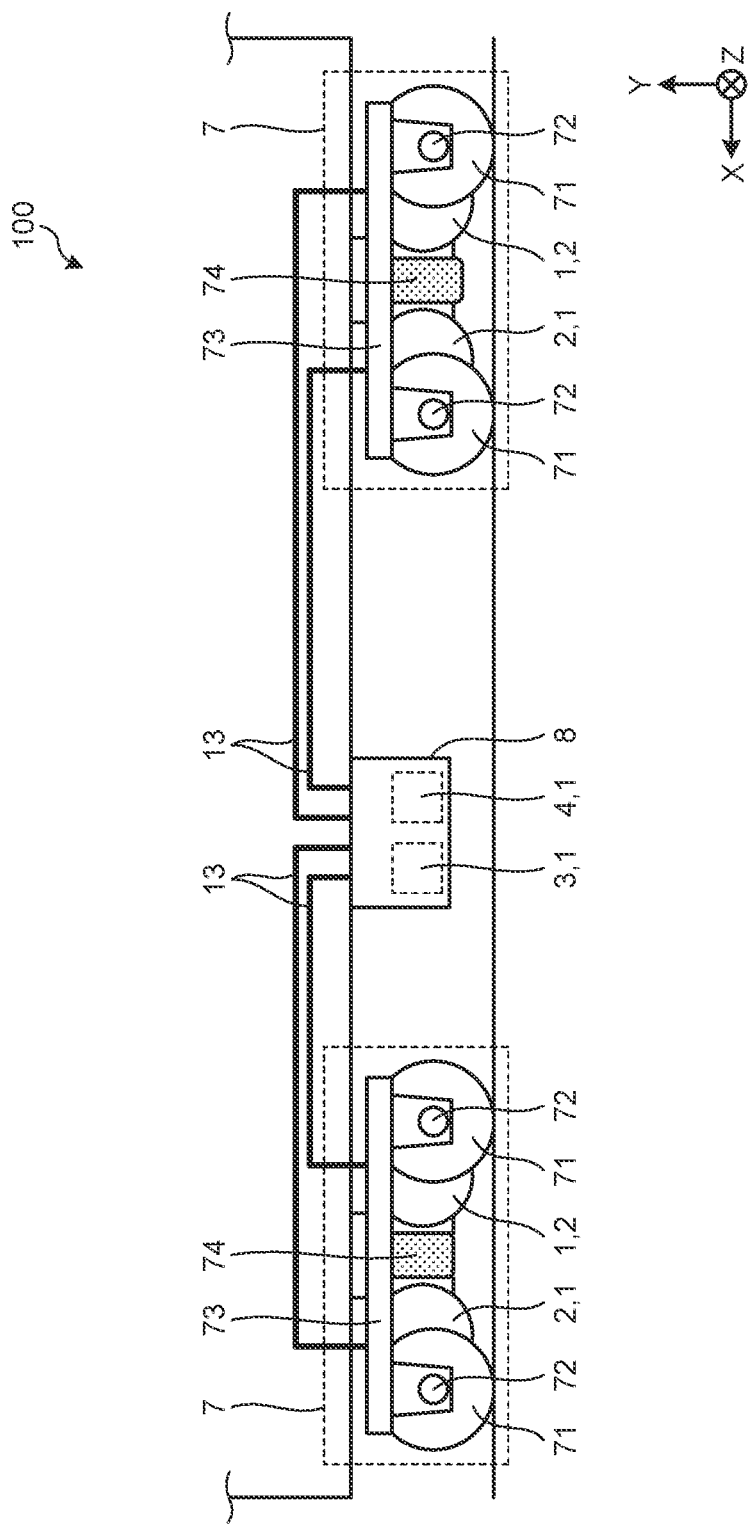
FIG. 1 is a side view illustrating a state in which a drive control device for electric vehicle according to a first embodiment of the present invention is mounted on electric vehicle.

FIG. 1 is a side view illustrating a state in which a drive control device 1 for electric vehicle according to a first embodiment of the present invention is mounted on electric vehicle 100. Hereinafter, the length direction of the electric vehicle 100 will be referred to as an I-axis direction, the height direction of the electric vehicle 100 will be referred to as a Y-axis direction, and the width direction of the electric vehicle 100 will be referred to as a Z-axis direction. The X-axis direction, the Y-axis direction, and the Z-axis direction are perpendicular to each other. The drive control device 1 for electric vehicle may also be referred to as a drive control device 1.

As illustrated in FIG. 1, the electric vehicle 100 is a railroad vehicle propelled by electric power, and includes a plurality of trucks 7 and the drive control device 1. The trucks 7 are arranged at intervals in the X-axis direction. The trucks 7 each include a truck frame 73 that supports the drive control device 1. The truck frame 73 has a support frame 74 protruding downward from a central part in the X-axis direction thereof. Axles 72 extending in the Z-axis direction are mounted on the truck frame 73. Wheels 71 are attached to both ends in the Z-axis direction of each of the axles 72.

The drive control device 1 includes an inverter-integrated motor 2, a switch 3, and a reactor 4.

The switch 3 and the reactor 4 are accommodated in a housing 8, and disposed under the floor of the electric vehicle 100. The housing B is arranged between adjacent trucks 7. The switch 3 is connected with a power collector, which is not illustrated, which receives direct-current power from overhead power lines, which are not illustrated. The reactor 4 has functions of reducing surge voltage from an overhead power line, which is not illustrated, and reducing or preventing the ripple component of currents caused by switching operations of semiconductor modules 62, which will be described later, from flowing out toward the overhead power line. The reactor 4 is connected with the inverter-integrated motor 2 via external connection conductors 13.

The inverter-integrated motor 2 is disposed in the truck 7 under the floor of the electric vehicle 100. The inverter-integrated motor 2, the switch 3, and the reactor 4 are arranged separately under the floor of the electric vehicle 100. Although not illustrated, various devices, in addition to the drive control device 1, necessary for traveling of the electric vehicle 100 are arranged under the floor of the actual electric vehicle 100.

Figure 2:
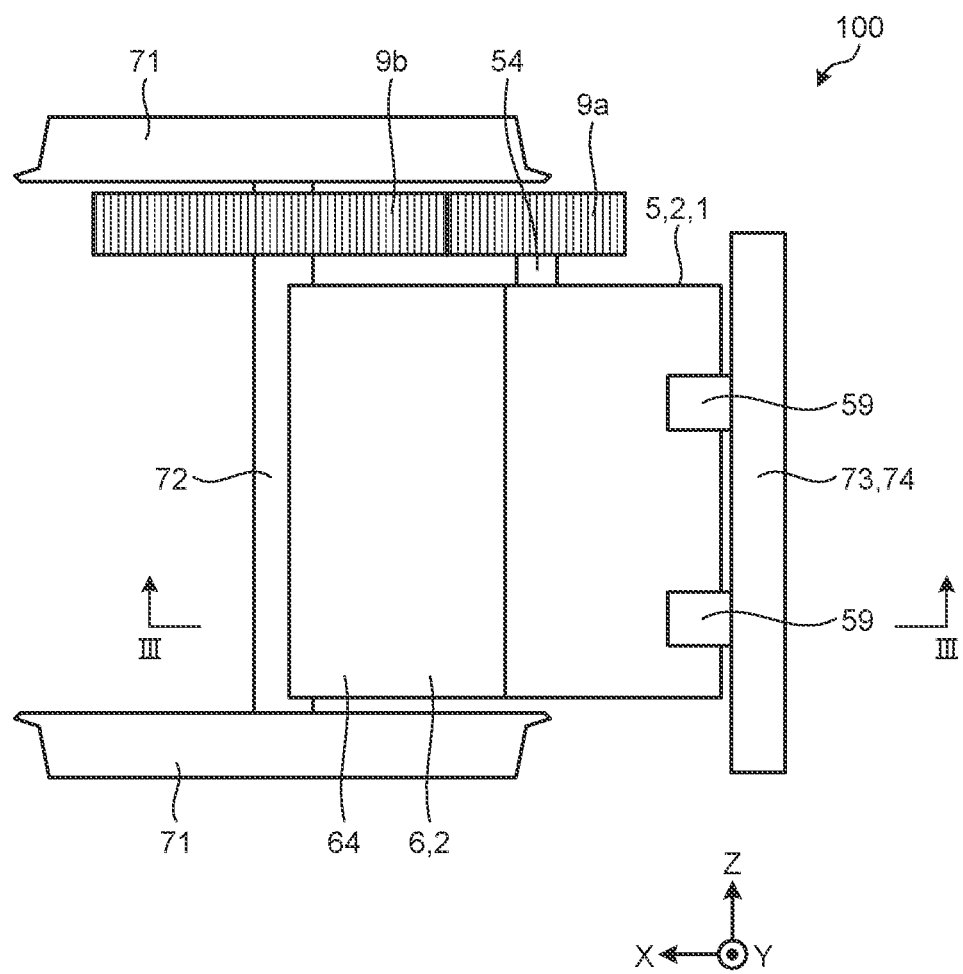
FIG. 2 is a plan view illustrating a state in which a drive control device for electric vehicle according to the first embodiment of the present invention is mounted on the electric vehicle.
Figure 3:
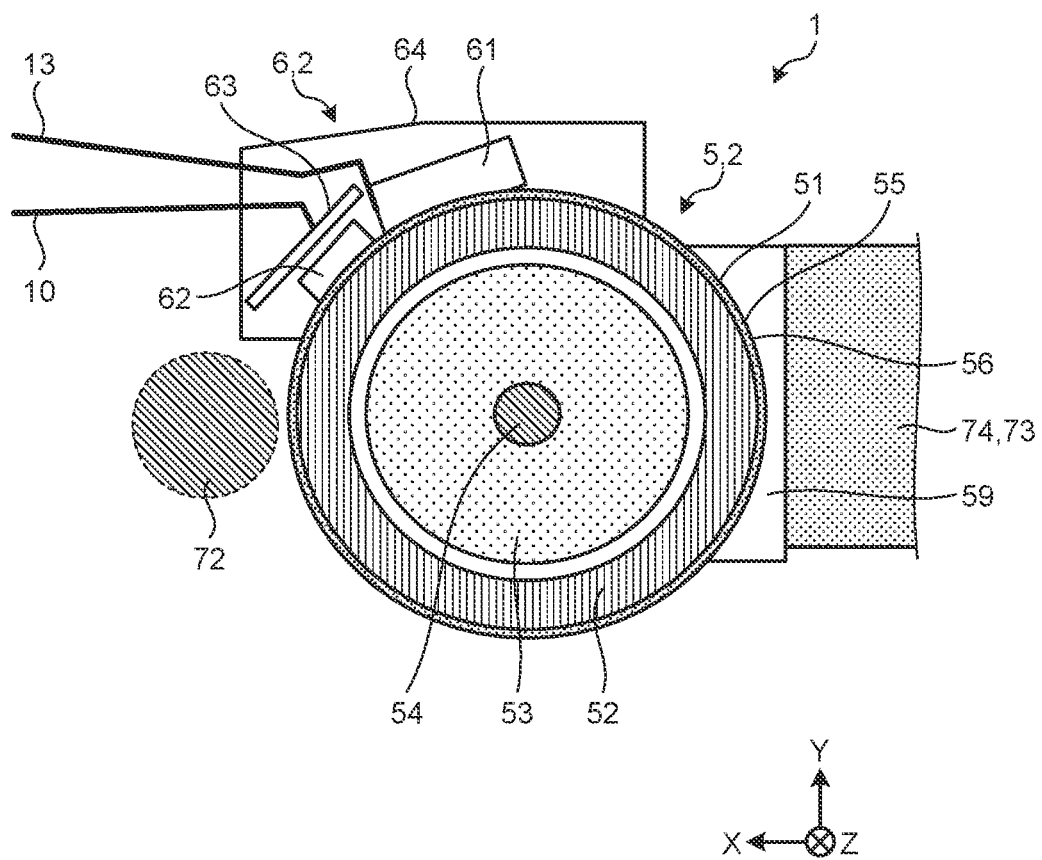
FIG. 3 is a cross-sectional view along line III-III illustrated in FIG. 2.
Figure 4:
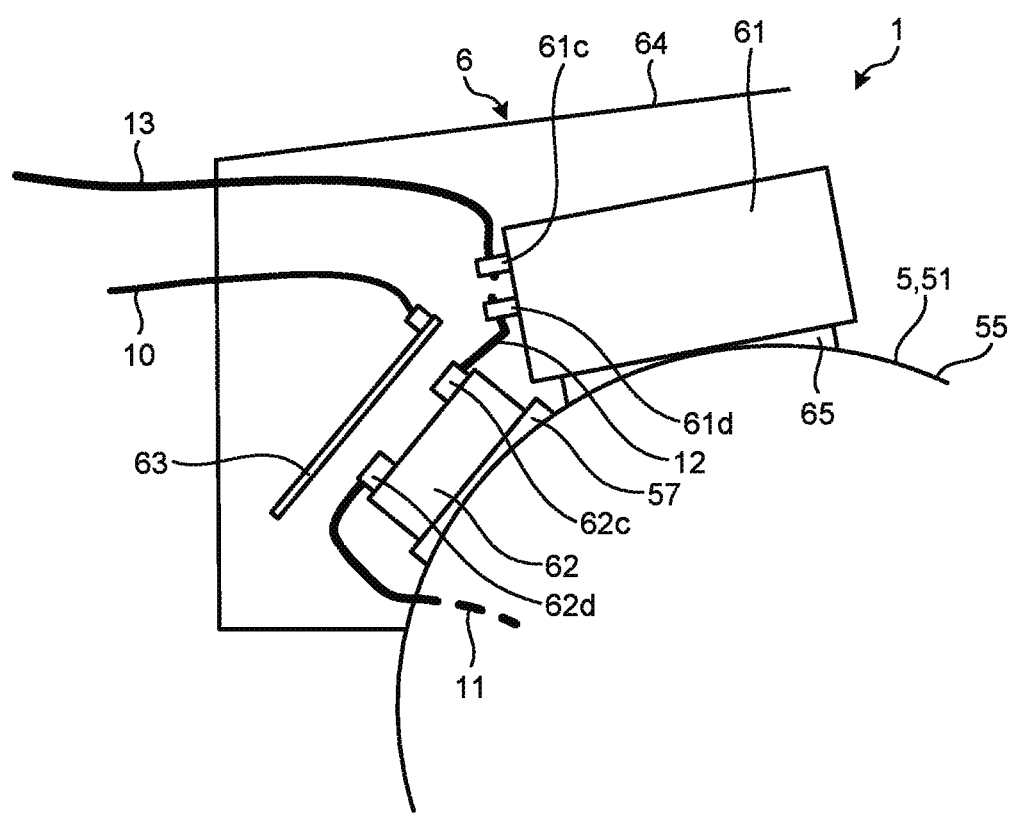
FIG. 4 is an enlarged cross-sectional view of a converter part illustrated in FIG. 3.

FIG. 2 is a plan view illustrating a state in which a drive control device 1 for electric vehicle according to the first embodiment of the present invention is mounted on the electric vehicle 100. FIG. 3 is a cross-sectional view along line III-III illustrated in FIG. 2. FIG. 4 is an enlarged cross-sectional view of a converter part 6 illustrated in FIG. 3. As illustrated in FIG. 3, the inverter-integrated motor 2 is a motor including a motor part 5 and the converter part 6. The motor part 5 has a function of applying driving force to the axle 72 to rotate the wheels 71. The motor part 5 includes a cylindrical motor frame 51, which is an outer frame of the motor part 5, a cylindrical stator 52 attached to an inner circumferential face of the motor frame 51, a cylindrical rotor 53 disposed inside the stator 52, and a columnar motor shaft 54, which passes through the center of the rotor 53. In the description below, explanation of directions about respective components of the inverter-integrated motor 2 will be based on the axial direction, the radial direction, and the circumferential direction of the motor part 5.

The stator 52 serves to generate a rotating magnetic field. The stator 52 is provided with a stator coil, which is not illustrated. The rotor 53 rotates in response to the rotating magnetic field. The motor shaft 54 rotates with the rotor 53. The motor frame 51 accommodates the stator 52 and the rotor 53. The motor frame 51 is made of metal. The metal is aluminum or steel, for example. The motor frame 51 is fixed to the support frame 74 by a motor fixing member 59. The motor frame 51 has an outer circumferential face 55. The shape of the outer circumferential face 55 is not particularly limited, and is a circular circumferential face in the present embodiment. The outer circumferential face 55 of the motor frame 51 includes a fixing face 56 to which the motor fixing member 59 is fixed.

As illustrated in FIG. 2, a pinion 9a is mounted on one axial end of the motor shaft 54. A gear 9b that meshes with the pinion 92 is mounted on one axial and of the axle 72. The rotational force of the motor shaft 54 is transmitted to the axle 72 via the pinion 9a and the gear 9b. This rotates the axle 72, and the wheels 71 coupled to the axle 72 thus rotate together.

The converter part 6 has a function of controlling the driving of the motor part 5. As illustrated in FIG. 3, the converter part 6 is disposed around the motor frame 51. Part of the converter part 6 is in contact with the outer circumferential face 55 of the motor frame 51. The axle 72 is located on one side in the X-axis direction with respect to the motor frame 51, and the motor fixing member 59 is located on the other side in the X-axis direction with respect to the motor frame 51. The converter part 6 is disposed in an area of the outer circumferential face 55 of the motor frame 51 with avoiding the axle 72 and the motor fixing member 59. In the present embodiment, the converter part 6 is disposed in an area, which is on the outer circumferential face 55 of the motor frame 51 between the axle 72 and the motor fixing member 59 and faces upward. The converter part 6 can thus be accessed from above the truck 7.

As illustrated in FIG. 4, the converter part 6 includes a capacitor 61, the semiconductor modules 62, a drive control board 63, and a cover 64. In the present embodiment, the semiconductor modules 62, the capacitor 61, the drive control board 63, and the cover 64 are disposed in the area of the outer circumferential face 55 of the motor frame 51 facing upward.

The capacitor 61 has functions of reducing or preventing surge voltage from an overhead power line, which is not illustrated, and reducing or preventing the ripple component of currents caused by switching operations of the semiconductor modules 62 from flowing out toward the overhead power line, which is not illustrated. The capacitor 61 is formed in a shape substantially following the outer circumferential face 55 of the motor frame 51. The capacitor 61 is fixed to the outer circumferential face 55 of the motor frame 51 by a capacitor fixing member 65.

The semiconductor modules 62 have a function of converting direct-current voltage held on the capacitor 61 into alternating-current power at a given frequency and a given voltage. The alternating-current power resulting from the conversion by the semiconductor modules 62 is supplied to the motor part 5. The semiconductor modules 62 are each attached to the outer circumferential face 55 of the motor frame 51 with a semiconductor module attachment 57 therebetween. The semiconductor module attachment 57 may be formed integrally with the outer circumferential face 55 of the motor frame 51, or may be formed separately from the motor frame 51 and fixed to the outer circumferential face 55 of the motor frame 51. The semiconductor module attachment 57 may be a cooling block made of aluminum formed separately from the motor frame 51, for example.

The drive control board 63 is a board for controlling the driving of the semiconductor modules 62. The drive control board 63 is disposed on a side opposite the motor frame 51 across the semiconductor modules 62. The drive control board 63 is connected with the semiconductor modules 62 via conductors, which are not illustrated. The drive control board 63 is connected with a control device, which is not illustrated, via a control signal cable 10.

The cover 64 is a member that covers the capacitor 61, the semiconductor modules 62, and the drive control board 63. The cover 64 is openable and closable. While the cover 64 is open, inspections of the semiconductor modules 62 and the like can be performed from above.

Figure 5:
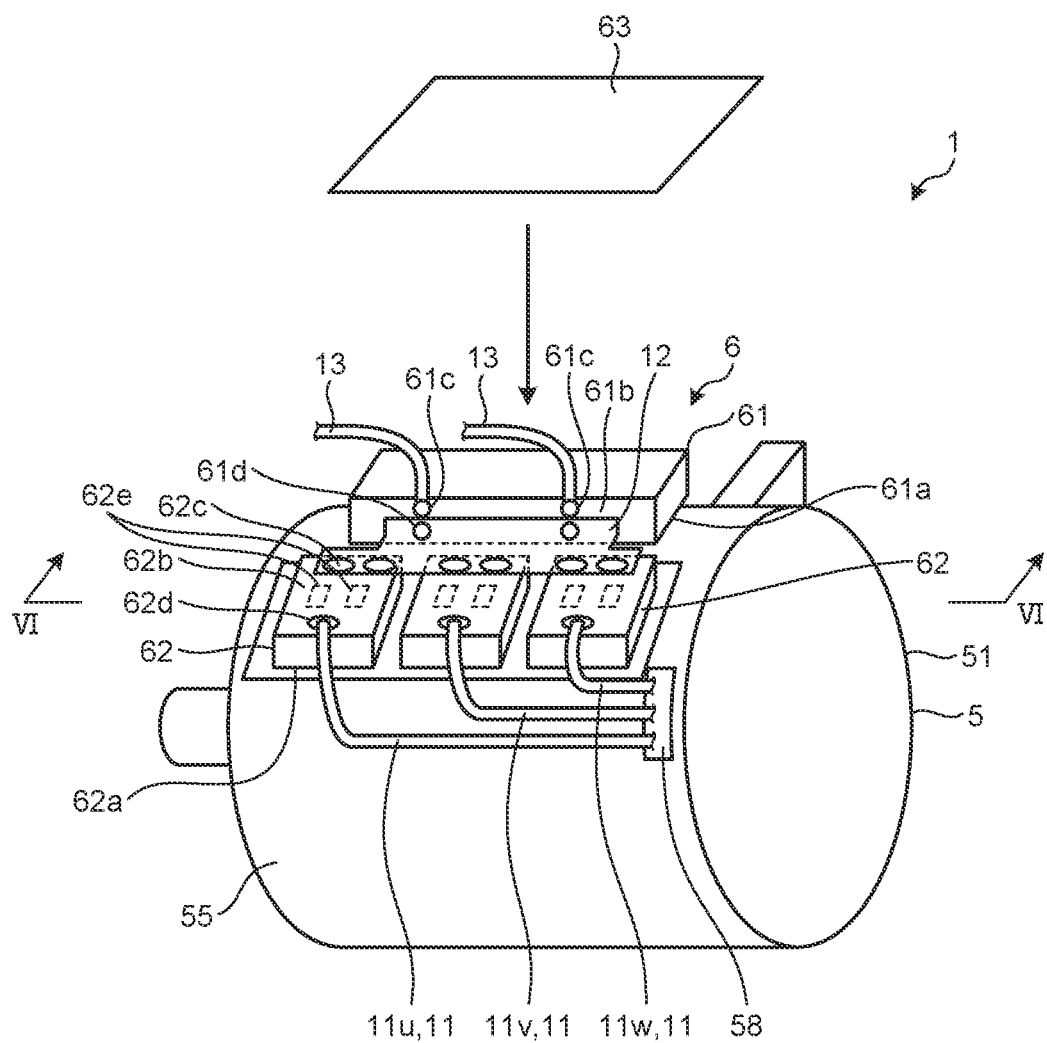
FIG. 5 is a perspective view schematically illustrating the converter part and a motor part of the drive control device for electric vehicle according to the first embodiment of the present invention.

The motor part 5, the capacitor 61, the semiconductor modules 62, and the drive control board 63 will now be described further with reference to FIG. 5. FIG. 5 is a perspective view schematically illustrating the converter part 6 and the motor part 5 of the drive control device 1 for electric vehicle according to the first embodiment of the present invention. The motor part 5 is driven by three-phase AC power in the present embodiment. The drive control device 1 includes a U-phase conductor 11*u*, a V-phase conductor 11*v*, and a N-phase conductor 11*w* that connect the converter part 6 with the motor part 5. Hereinafter, the U-phase conductor 11*u*, the V-phase conductor 11*v*, and the W-phase conductor 11*w* may collectively be referred to as motor conductors 11.

The capacitor 61 and the semiconductor modules 62 are arranged in the circumferential direction of the motor part 5. The capacitor 61 has a rectangular shape. The capacitor 61 has a motor-part-side-attaching-face 61*a* facing the motor part 5, and a capacitor-side-terminal-face 61*b* an which a plurality of external connection terminals 61*c* and a plurality of capacitor-side connection terminals 61*d* are provided. The capacitor 61 is disposed on the outer circumferential face 55 of the motor frame 51 so that the capacitor-side connection terminals 61*d* face the semiconductor modules 62. The external connection terminals 61*c* are arranged at an interval in the axial direction. The external connection terminals sic are each connected with an external connection conductor 13 leading to the reactor 4, which is not illustrated. The capacitor-side connection terminals 61*d* are arranged at an interval in the axial direction.

Three semiconductor modules 62 are arranged at intervals in the axial direction. A semiconductor module 62 that is leftmost in the drawing is connected with the U-phase conductor 11*u*. A semiconductor module 62 at the center is connected with the v-phase conductor 11*v*. A semiconductor module 62 that is rightmost in the drawing is connected with the W-phase conductor 11*w*.

The semiconductor modules 62 have a rectangular parallelepiped shape. Each of the semiconductor modules 62 has semiconductor elements 62*e* that generate heat when the semiconductor module 62 is driven, a radiating surface 62*a* for cooling the semiconductor elements 62*e*, and a module side terminal face 62*b* an which a plurality of direct-current side terminals 62*c* and a plurality of alternating-current side terminals 62*d* are provided. The semiconductor modules 62 are arranged an the outer circumferential face 55 of the motor frame 51 with the radiating surfaces 62*a* facing the motor part 5 and the module side terminal faces 62*b* facing opposite to the motor part 5. The semiconductor elements 62*e* are elements having an upper limit of junction temperature that is higher than temperature of the motor part 5 heated. In a case where the material of the motor frame 51 is steel or aluminum, the surface temperature of the motor frame 51 becomes 100° C. or higher during operation of the motor part 5, and semiconductor elements 62*e* having a junction temperature upper limit of 125° C. or lower are therefore less likely to transfer heat produced by the semiconductor modules 62 to the motor frame 51. Thus, in the present embodiment, the semiconductor elements 62*e* having a junction temperature upper limit of 150° C. or higher are used. The semiconductor elements 62*e* are formed of wide band gap semiconductors such as sic elements, which are resistant to heat, for example. With the wide band gap semiconductors, the semiconductor elements 62*e* have a junction temperature upper limit of 150° C. to 175° C. The radiating surfaces 62*a* are partially or entirely in contact with the outer circumferential face 55 of the motor frame 51. Contact used herein means that part or the whole of radiating surfaces 62*a* are directly in contact with the outer circumferential face 55 of the motor frame 51 so that heat produced by the semiconductor elements 62*e* can be transferred to the motor frame 51. Contact used herein also includes that part or the whole of radiating surfaces 62*a* are thermally in contact with the outer circumferential face 55 of the motor frame 51 so that heat produced by the semiconductor elements 62*e* can be transferred to the motor frame 51. In other words, media that can transfer heat produced by the semiconductor elements 62*e* to the motor frame 51 may be placed between part or the whole of the radiating surfaces 62*a* and the outer circumferential face 55 of the motor frame 51. The radiating surfaces 62*a* and the module side terminal faces 62*b* have a dimension of 130 mm×130 mm in length and width, for example.

The direct-current side terminals 62*c* are arranged at intervals in the axial direction. The alternating-current side terminals 62*d* are arranged at intervals in the axial direction. Bach of the direct-current side terminals 62*c* is disposed at a position close to the capacitor 61 with respect to the center of the module side terminal face 62*b*. The capacitor-side connection terminals 61*d* and the direct-current side terminals 62*c* are connected with each other via a direct-current connection conductor 12. For the direct-current connection conductor 12, a laminated bus bar including a positive conductor plate and a negative conductor plate between insulating films is preferably used. The direct-current connection conductor 12 is substantially parallel to the outer circumferential face 55 of the motor frame 51.

The alternating-current side terminals 62*d* are arranged on a side opposite the direct-current side terminals 62*c* across the centers of the module side terminal faces 62*b*. The alternating-current side terminals 62d are connected with a stator coil, which is not illustrated, of the motor part 5 via the motor conductors 11. The motor frame 51 has a lead-out hole 51 for drawing the motor conductors 11 to the outside of the motor frame 51. The lead-out hole 58 is disposed at a position close to one side in the axial direction on the outer circumferential face 55 of the motor frame 51. The lead-out hole 58 is longer in the circumferential direction than in the axial direction. The motor conductors 11 are arranged in the circumferential direction, and radially drawn out through the lead-out hole 58 in this state. Note that part of a conductor constituting the stator coil may be drawn out through the lead-out hole 58 and used as the motor conductors 11, or cables, bus bars, or the like other than the conductor of the stator coil may be used for the motor conductors 11. When the conductor constituting the stator coil is used as the motor conductors 11, as compared with the case where other cables, bus bars or the like are used for the motor conductors 11, processing of junctions of the motor conductors 11 is unnecessary, which can further reduce the drive control device 1 in size and weight.

Figure 6:
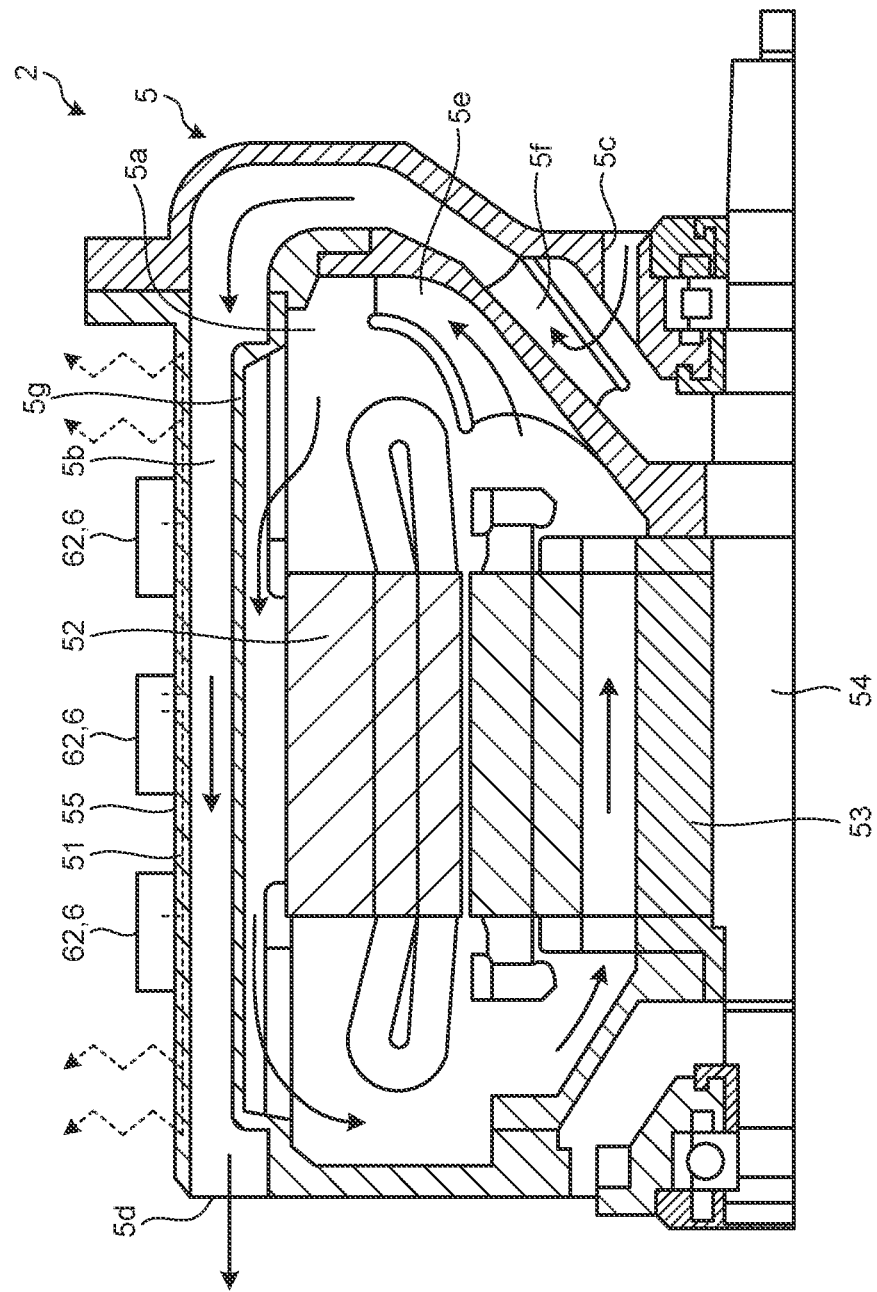
FIG. 6 is a cross-sectional view along line VI-VI illustrated in FIG. 5.

Next, an air passage of the motor part 5 will be described with reference to FIG. 6. FIG. 6 is a cross-sectional view along line VI-VI illustrated in FIG. 5. FIG. 6 illustrates only one side in the radial direction of the motor part 5. In FIG. 6, illustration of the semiconductor module attachments 57 is omitted. In addition, broken line arrows illustrated in FIG. 6 schematically express a state in which heat produced by the semiconductor modules 62 is transferred to the motor frame 51 and then released into the air. The motor part 5 is a totally enclosed motor. An internal air passage 5a and an external air passage 5b are formed inside the motor part 5. The internal air passage 5a is an air passage for circulating internal air inside of the enclosed motor part 5. The external air passage 5b is an air passage for taking external air into the motor part 5, circulating the air, and then exhausting the air out of the motor part 5. The external air passage 5b has an inlet port 5c through which external air flows in, and an exhaust port 5d through which external air is exhausted. An inner fan 5e for circulating internal air and sending the internal air to the stator 52 and the rotor 53 is installed in the internal air passage 5a. An outer fan 5f for sending external air from the inlet port 5c toward the exhaust port 5d is installed in the external air passage 5b. The external air passage 5b and the internal air passage 5a are formed with a wall 5g therebetween. The external air passage 5b is formed between the motor frame 51 and the internal air passage 5a.

When the motor part 5 operates, heat is produced inside the motor part 5. The heat produced inside the motor part 5 increases the temperature of the internal air in the internal air passage 5a. The internal air increased in temperature is circulated through the internal air passage 5a by the inner fan 5e. In the meantime, external air flows into the external air passage 5b through the inlet port 5c. The external air flowing into the external air passage 5b is caused to flow through the external air passage 5b by the outer fan 5f. The external air is air having a lower temperature than the internal air. Heat is exchanged between the internal air circulating through the internal air passage 5a and the external air flowing through the external air passage 5b via the wall 5g. As a result, the heat produced inside the motor part 5 is released out of the motor part 5 via the external air flowing through the external air passage 5b. In the present embodiment, the semiconductor modules 62 are arranged at intervals along the flowing direction of the external air flowing through the external air passage 5b. The semiconductor modules 62 are separated from the external air passage 5b by the motor frame 51.

Next, the effects of the drive control device 1 for electric vehicle according to the present embodiment will be described.

In the present embodiment, as illustrated in FIGS. 1 and 3, because the drive control device 1 includes the inverter-integrated motor 2 in which the motor part 5 and the converter part 6 are integrated, the motor part 5 and the converter part 6 can be disposed together on the truck 7. As a result, the converter part 6 need not occupy the space in the housing a that has conventionally been occupied by a converter, and the housing a can be reduced in size accordingly. This can achieve reduction in size of the housing 8 without changing the specification of the drive control device 1.

In the present embodiment, as illustrated in FIG. 3, the converter part 6 is disposed around the motor frame 51 and the semiconductor modules 62 are in contact with the outer circumferential face 55 of the motor part 5, which enables heat produced in the semiconductor modules 62 to be transferred to the motor frame 51. As illustrated in FIG. 6, the heat transferred from the semiconductor modules 62 to the motor frame 51 is then released from the motor frame 51 into the air. In other words, the heat produced in the semiconductor modules 62 can be dissipated via the motor frame 51, and the semiconductor modules 62 are thus cooled. As a result, the inverter-integrated motor 2 can be reduced in size and weight as compared with a case where a dedicated cooling fan for cooling the converter part 6 is mounted an the inverter-integrated motor 2 and a case where wind produced by a cooling fan inside the motor part 5 is caused to flow through the outer circumferential face 55 of the motor frame 51 by using a duct or the like to cool the converter part 6. In other words, because dedicated cooling means for cooling the converter part 6 is unnecessary while the function of cooling the converter part 6 is ensured, the inverter-integrated motor 2 can be reduced in size and weight. Note that the surface temperature of the motor frame 51 becomes 100° C. or higher during operation of the motor part 5. In the present embodiment, the semiconductor elements 62e illustrated in FIG. 5 are formed of wide band gap semiconductors having a junction temperature upper limit of 150° C. to 175° C. Thus, the heat of the semiconductor modules 62 can be reliably transferred to the motor frame 51 and the semiconductor modules 62 can thus be cooled without being affected by the surface temperature and the material of the motor frame 51.

In the present embodiment, as illustrated in FIG. 6, heat is exchanged between the motor frame 51 and the external air flowing through the external air passage 5b. In other words, the external air flowing through the external air passage 5b absorbs heat transferred to the motor frame 51. As a result, the semiconductor modules 62 are cooled by the external air flowing through the external air passage 5b via the motor frame 51.

In the present embodiment, as illustrated in FIG. 3, because the converter part 6 is disposed around the motor frame 51, the position of the converter part 6 can be changed by using the space around the motor frame 51. As a result, the degree of freedom in selecting the installation position of the converter part 6 can be increased as compared with a case where the converter part 6 is positioned at one end along the axial direction of the inverter-integrated motor 2.

In the present embodiment, as illustrated in FIG. 5, because the semiconductor modules 62 are arranged on the outer circumferential face 55 of the motor frame 51 with the radiating surfaces 62a facing the motor part 5, heat produced by the semiconductor modules 62 can be efficiently transferred to the motor frame 51.

In the present embodiment, as illustrated in FIG. 4, because the drive control board 63 is disposed on a side opposite the motor frame 51 across the semiconductor modules 62, the distance between the drive control board 63 and the semiconductor modules 62 can be decreased, which can make the conductors connecting the drive control board 63 with the semiconductor modules 62 shorter. As a result, the semiconductor modules 62 can be optimally driven, and the performance of the semiconductor modules 62 can be maximized.

As illustrated in FIG. 5, because the capacitor 61 includes a plurality of external connection terminals 61c, the external connection conductors 13 provided from outside the converter part 6 can be directly connected with the capacitor 61, which eliminates the need for additionally providing a junction member much as a terminal block. As a result, the converter part 6 can be reduced in size and weight.

As illustrated in FIG. 5, the capacitor 61 is positioned on the outer circumferential face 55 of the motor frame 51 with the capacitor-side connection terminals 61d facing the semiconductor modules 62, and the capacitor-side connection terminals 61d are arranged at an interval in the axial direction. The direct-current side terminals 62c of the semiconductor modules 62 are arranged at intervals in the axial direction, and at positions close to the capacitor 61 with respect to the centers of the module side terminal faces 62b. As a result, the capacitor-side connection terminals 61d can be connected with the direct-current side terminals 62c by the direct-current connection conductors 12 due to shorter distances between the capacitor-side connection terminals 61d and the direct-current side terminals 62c along the circumferential direction. In addition, because the distances between the capacitor-side connection terminals 61d and the direct-current side terminals 62c along the circumferential direction are decreased, the direct-current connection conductor 12 can be reduced in dimension along the circumferential direction, which can reduce the size of the direct-current connection conductor 12. Note that, in order to improve the vibration resistant performance of the direct-current connection conductor 12 to vibration applied to the truck 7 by the wheels 71, the direct-current connection conductor 12 needs to be fixed to the motor frame 51 with fixing members such as screws. As the size of the direct-current connection conductor 12 is larger, the direct-current connection conductor 12 becomes heavier, and the number of fixing members needs to be increased or more robust and larger fixing members need to be used, which increases the inverter-integrated motor 2 in size, weight, and cost. In this regard, in the present embodiment, because the direct-current connection conductor 12 is reduced in size, the number of fixing members can be reduced or smaller fixing members can be used, which can reduce the inverter-integrated motor 2 in size, weight, and cost.

In the present embodiment, as illustrated in FIG. 5, the lead-out hole 58 is at a position close to one side in the axial direction of the outer circumferential face 55 of the motor frame 51, and the motor conductors 11 are arranged in the circumferential direction and drawn out through the lead-out hole 58 in this state, which can reduce the stator 52 and the rotor 53 in dimension in the axial direction.

While the motor frame 51 has a cylindrical shape in the present embodiment, the motor frame 51 may have a quadrangle cylinder shape or the like. In addition, while the outer circumferential face 55 of the motor frame 51 has a shape of a circular circumferential face in the present embodiment, the outer circumferential face 55 may have a rectangular annular shape or the like. In addition, while the drive control board 63 is disposed on a side opposite the motor frame 51 across the semiconductor modules 62 in the present embodiment, the drive control board 63 may be disposed on a side opposite the motor frame 51 across the capacitor 61.

Second Embodiment

Figure 7:
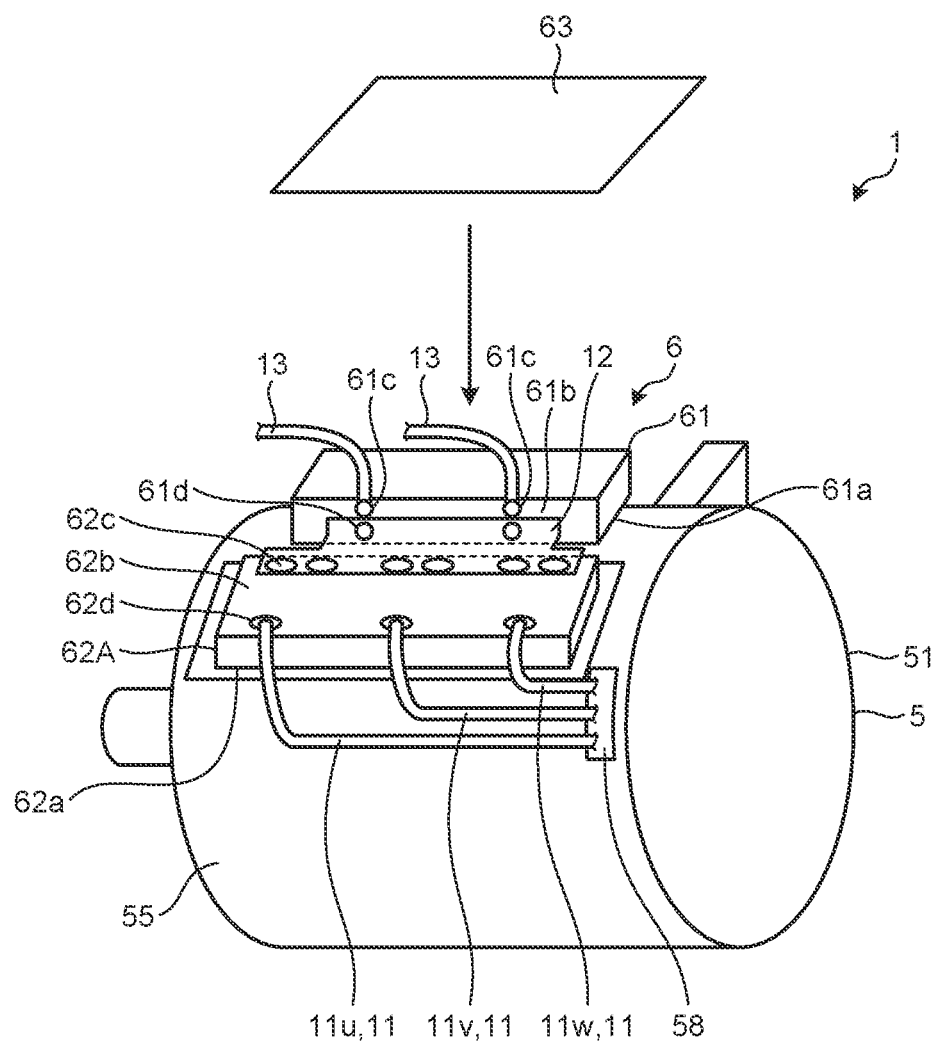
FIG. 7 is a perspective view schematically illustrating a converter part and a motor part of a drive control device for electric vehicle according to a second embodiment of the present invention.

FIG. 7 is a perspective view schematically illustrating a converter part 6 and a motor part 5 of a drive control device 1 for electric vehicle according to a second embodiment of the present invention. The present embodiment differs from the first embodiment described above in that one semiconductor module 62A is included. Note that, in the second embodiment, parts overlapping with those of the first embodiment will be represented by the same reference numerals and the description thereof will not be repeated.

The converter part 6 according to the present embodiment includes one semiconductor module 62A connected with each of the U-phase conductor 11u, the v-phase conductor 11v, and the W-phase conductor 11w. The semiconductor module 62A has a rectangular shape. The semiconductor module 62A has a long side of 300 mm and a short side of 130 mm, for example. The semiconductor module 62A and the motor part 5 are arranged so that the longitudinal direction of the semiconductor module 62A is parallel to the axial direction of the motor part 5. In the present embodiment, because one semiconductor module 62A is used, the number of components can be reduced as compared with the first embodiment described above.

Third Embodiment

Figure 8:
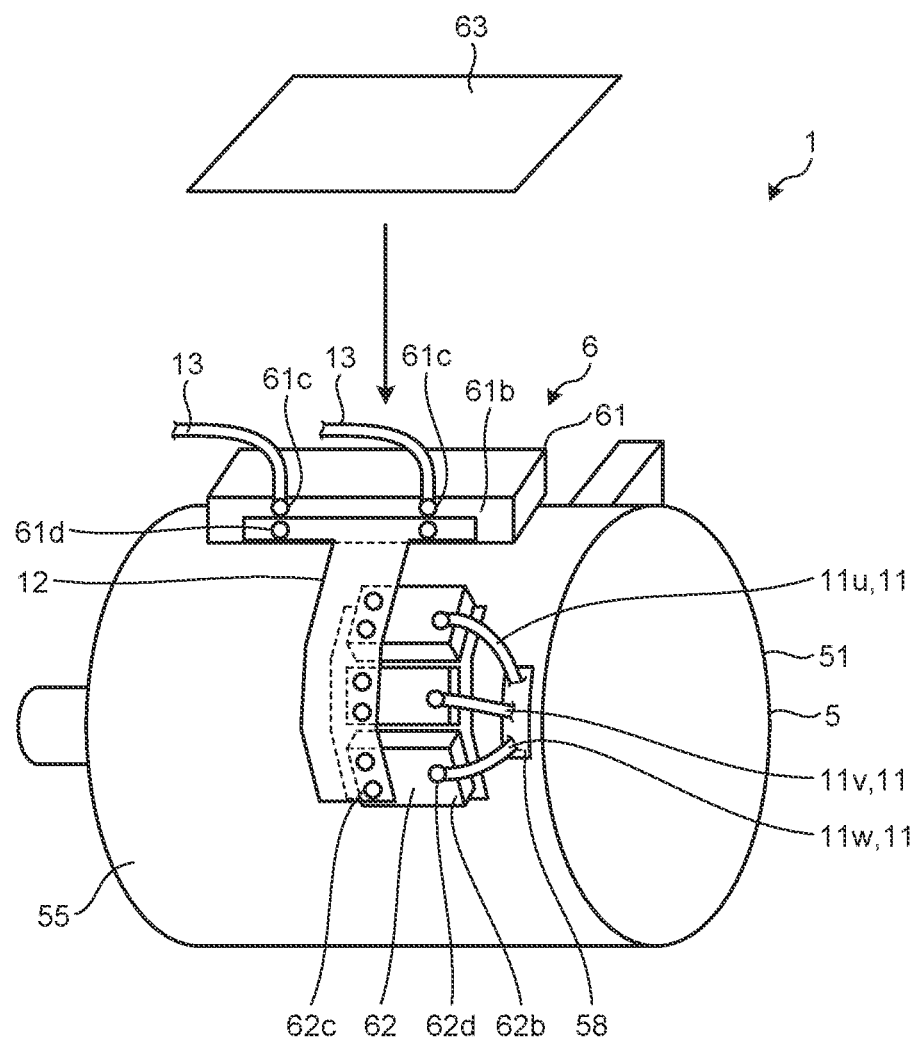
FIG. 8 is a perspective view schematically illustrating a converter part and a motor part of a drive control device for electric vehicle according to a third embodiment of the present invention.

FIG. 8 is a perspective view schematically illustrating a converter part 6 and a motor part 5 of a drive control device 1 for electric vehicle according to a third embodiment of the present invention. The present embodiment, differs from the first embodiment described above in that a plurality of semiconductor modules 62 are arranged in the circumferential direction. Note that, in the third embodiment, parts overlapping with those of the first embodiment will be represented by the same reference numerals and the description thereof will not be repeated.

The semiconductor modules 62 are arranged at intervals in the circumferential direction. In the present embodiment, the semiconductor modules 62 are arranged at intervals along a direction perpendicular to the flowing direction of the external air flowing through the external air passage 5b, which is not illustrated. The direct-current side terminals 62c of the respective semiconductor modules 62 are arranged at intervals in the circumferential direction. The alternating-current side terminals 62d of the respective semiconductor modules 62 are arranged at intervals in the circumferential direction. The alternating-current side terminals 62d of the semiconductor modules 62 are arranged at positions close to the lead-out hole 58 with respect to the centers in the axial direction of the module side terminal faces 62b.

In the present embodiment, because the semiconductor modules 62 are arranged at intervals along the direction perpendicular to the flowing direction of the external air flowing through the external air passage 5b, the semiconductor modules 62 are attached to areas of the outer circumferential face 55 of the motor frame 51 in which the surface temperatures are uniform. As a result, variation in the temperatures of the semiconductor modules 62 can be reduced, and the lifetimes of the semiconductor modules 62 can be equalized. In the present embodiment, because the semiconductor modules 62 are arranged at intervals in the circumferential direction, the distances between the alternating-current side terminals 62d and the lead-out hole 58 can be made shorter than those in the first embodiment in which the semiconductor modules 62 are arranged in the axial direction of the motor part 5. As a result, the motor conductors 11 drawn out through the lead-out hole 58 can be reduced in length.

Fourth Embodiment

Figure 9:
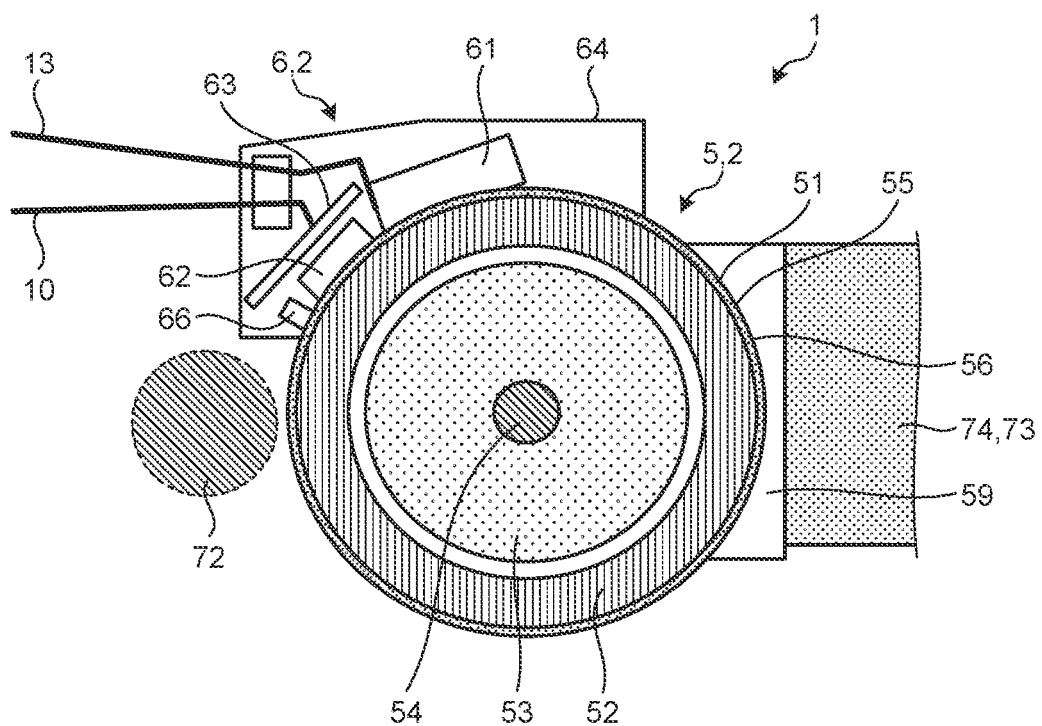
FIG. 9 is a cross-sectional view illustrating a converter part and a motor part of a drive control device for electric vehicle according to a fourth embodiment of the present invention.
Figure 10:
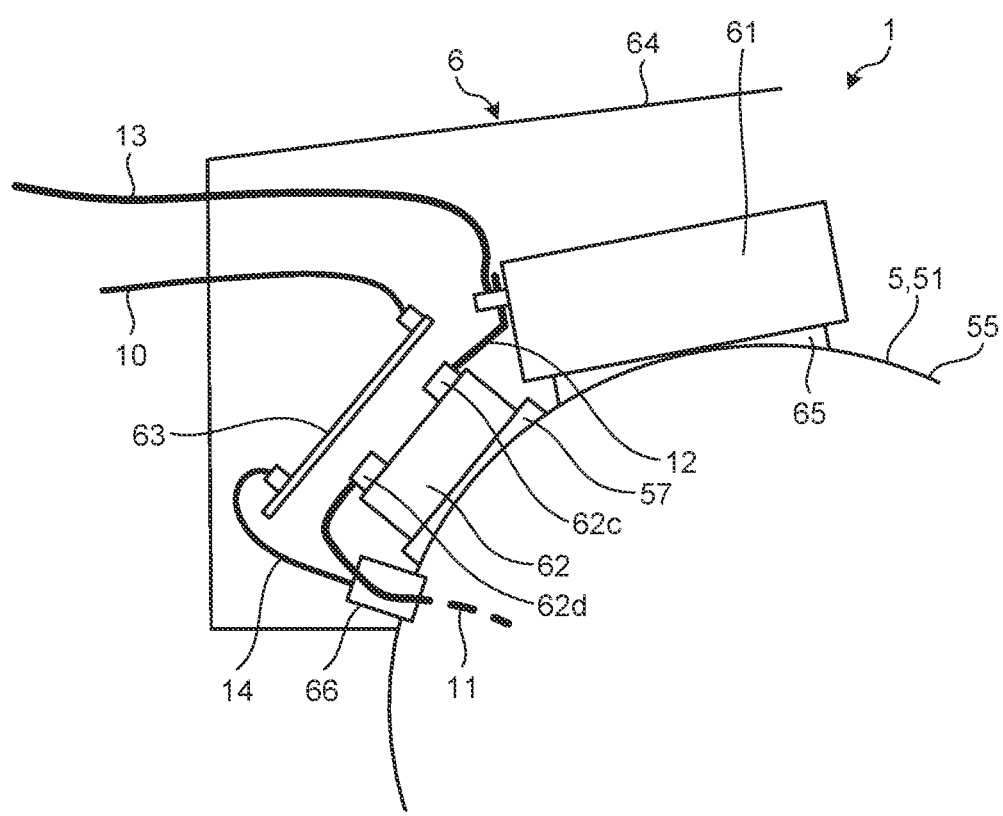
FIG. 10 is an enlarged cross-sectional view of the converter part illustrated in FIG. 9.

FIG. 9 is a cross-sectional view illustrating a converter part 6 and a motor part 5 of a drive control device 1 for electric vehicle according to a fourth embodiment of the present invention. FIG. 10 is an enlarged cross-sectional view of the converter part 6 illustrated in FIG. 9. The present embodiment differs from the first embodiment described above in that a detector for motor 66 is further included. Note that, in the fourth embodiment, parts overlapping with those of the first embodiment will be represented by the same reference numerals and the description thereof will not be repeated.

The converter part 6 includes the detector for motor 66. The detector for motor 66 is a detector for detecting any one of the temperature, the vibration, the sound, the partial discharge, and the insulating state of the motor part 5. As illustrated in FIG. 10, the detector for motor 66 is connected with the drive control board 63 via a cable 14. A detection signal from the detector for motor 66 is transmitted to the drive control board 63. The drive control board 63 transmits the detection signal from the detector for motor 66 to a control device, which is not illustrated.

In the present embodiment, the converter part 6 includes the detector for motor 66 for detecting any one of the temperature, the vibration, the sound, the partial discharge, and the insulating state of the motor part 5. Thus, an overtemperature of the motor part 5, a bearing failure in the motor part 5, an insulation failure of the stator coil, an error in the wheels 71 and the pinions and gears 9a and 9b, an error in the truck 7, or a sign thereof can be detected. In addition, the detection signal is transmitted to a control device, and can thus be used for protection, maintenance, and the like of the electric vehicle 100. In other words, as a result of mounting the converter part 6 including the detector for motor 66 and the drive control board 63 on the motor part 5, condition based maintenance (CBM) can be achieved.

Fifth Embodiment

Figure 11:
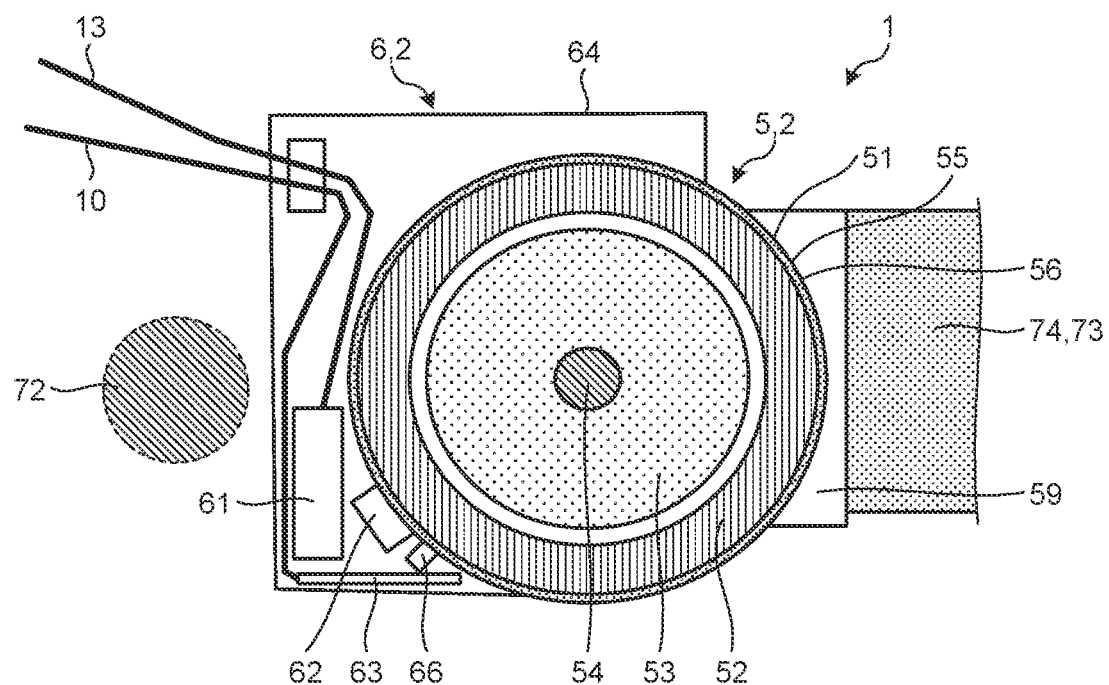
FIG. 11 is a cross-sectional view illustrating a converter part and a motor part of a drive control device for electric vehicle according to a fifth embodiment of the present invention.

FIG. 11 is a cross-sectional view illustrating a converter part 6 and a motor part 5 of a drive control device 1 for electric vehicle according to a fifth embodiment of the present invention. The present embodiment differs from the fourth embodiment described above in the installation position of the converter part 6. Note that, in the fifth embodiment, parts overlapping with those of the fourth embodiment will be represented by the same reference numerals and the description thereof will not be repeated.

The capacitor 61, the semiconductor modules 62, the drive control board 63, and the detector for motor 66 are arranged on a side opposite the motor fixing member 59 across the motor part 5, and at positions lower than the motor shaft 54 of the motor part 5. In the present embodiment, the cover 64 is disposed an the outer circumferential face 55 of the motor frame 51 from an area on the outer circumferential face 55 facing upward to an area thereof facing opposite to the motor fixing member 59. Part of the converter part 6 is between the motor part 5 and the axle 72. Because the semiconductor modules 62 and the like are disposed collectively at a lower part of the motor part 5, the converter part 6 can be accessed from below the truck 7. As a result, the maintenance of the converter part 6 can be easily performed in a state in which the electric vehicle 100 is in pits.

Sixth Embodiment

Figure 12:
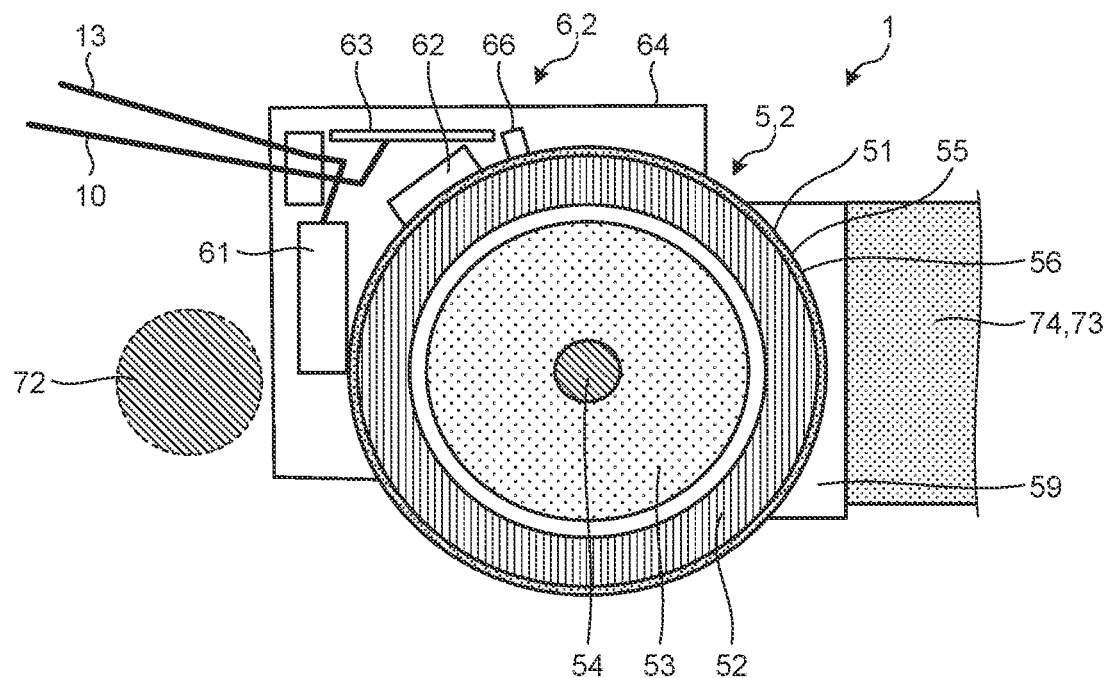
FIG. 12 is a cross-sectional view illustrating a converter part and a motor part of a drive control device for electric vehicle according to a sixth embodiment of the present invention.

FIG. 12 is a cross-sectional view illustrating a converter part 6 and a motor part 5 of a drive control device 1 for electric vehicle according to a sixth embodiment of the present invention. The present embodiment differs from the fourth embodiment described above in the installation position of the capacitor 61. Note that, in the sixth embodiment, parts overlapping with those of the fourth embodiment will be represented by the same reference numerals and the description thereof will not be repeated.

The capacitor 61 is disposed on the outer circumferential face 55 of the motor part 5 an a side opposite the motor fixing member 59 across the motor part 5. Such position of the capacitor 61 enables the converter part 6 to be reduced in height.

Seventh Embodiment

Figure 13:
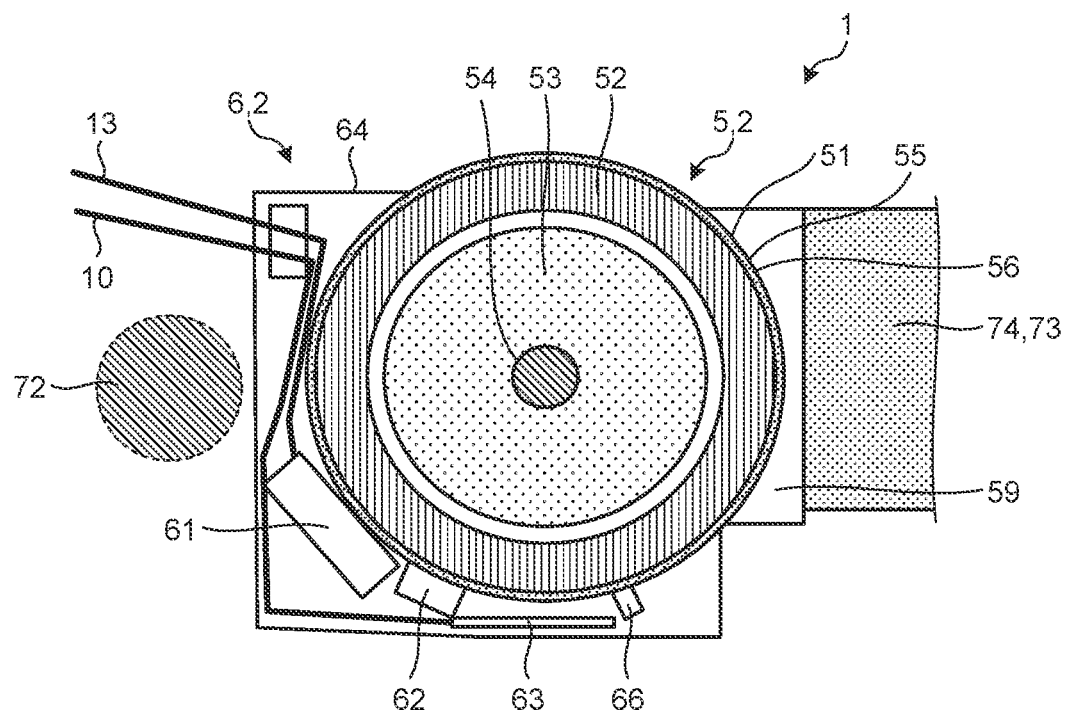
FIG. 13 is a cross-sectional view illustrating a converter part and a motor part of a drive control device for electric vehicle according to a seventh embodiment of the present invention.

FIG. 13 is a cross-sectional view illustrating a converter part 6 and a motor part 5 of a drive control device 1 for electric vehicle according to a seventh embodiment of the present invention. The present embodiment differs from the fourth embodiment described above in the installation position of the converter part 6. Note that, in the seventh embodiment, parts overlapping with those of the fourth embodiment will be represented by the same reference numerals and the description thereof will not be repeated.

The capacitor 61, the semiconductor modules 62, the drive control board 63, and the detector for motor 66 are arranged, an the outer circumferential face 55 of the motor frame 51, in the circumferential direction from an area of the outer circumferential face 55 facing opposite to the motor fixing member 59 to an area thereof facing downward. In the present embodiment, the cover 64 is disposed, on the outer circumferential face 55 of the motor frame 51, from an area of the outer circumferential face 55 facing opposite to the motor fixing member 59 to an area thereof facing downward. Part of the converter part 6 is disposed between the motor part 5 and the axle 72. Because the semiconductor modules 62 and the like are arranged in the circumferential direction from the area of the outer circumferential face 55 of the motor frame 51 facing opposite to the motor fixing member 59 to the area thereof facing downward, the semiconductor modules 62 and the like can be accessed from below the truck 7, from a side of the truck 7, and the like.

Eighth Embodiment

FIG. 14 is a cross-sectional view illustrating a converter part 6 and a motor part 5 of a drive control device for electric vehicle according to an eighth embodiment of the present invention, corresponding to a cross-sectional view along line VI-VI illustrated in FIG. 5. The present embodiment differs from the first embodiment described above in cooling means for cooling the inside of the motor part 5. Note that, in the eighth embodiment, parts overlapping with those of the first embodiment will be represented by the same reference numerals and the description thereof will not be repeated. Broken line arrows illustrated in FIG. 14 schematically express a state in which heat produced by the semiconductor modules 62 is transferred to the motor frame 51 and then released into the air.

As illustrated in FIG. 14, the internal air passage 5a, the external air passage 5b, the inner fan 5e, and the outer fan 5f illustrated in FIG. 6 are not present in the motor part 5. The motor part 5 of the present embodiment has a structure for transferring heat generated by the stator coil and the like in the motor part 5 to the outside by heat conduction, and a structure for releasing the transferred heat into the air, for example, to cool the motor part 5.

In the present embodiment, the semiconductor modules 62 are in contact with the outer circumferential face 55 of the motor part 5, which enables heat produced in the semiconductor modules 62 to be transferred to the motor frame 51. The heat transferred from the semiconductor modules 62 to the motor frame 51 is then released from the motor frame 51 into the air. In other words, the heat produced in the semiconductor modules 62 can be dissipated via the motor frame 51, and the semiconductor modules 62 are thus cooled. As a result, the inverter-integrated motor 2 can be reduced in size and weight as compared with a case where a dedicated cooling fan for cooling the converter part 6 is mounted on the inverter-integrated motor 2, and a case where wind produced by a cooling fan inside the motor part 5 is caused to flow through the outer circumferential face 55 of the motor frame 51 by using a duct or the like to cool the converter part 6. In other words, because dedicated cooling means for cooling the converter part 6 is unnecessary while the function of cooling the converter part 6 is ensured, the inverter-integrated motor 2 can be reduced in size and weight.

As in the present embodiment, the motor part 5 without the internal air passage 5a, the external air passage 5b, the inner fan 5e, and the outer fan 5f illustrated in FIG. 6, can also dissipate heat in the semiconductor modules 62 into the air via the motor frame 51, and can thus cool the semiconductor modules 62. Thus, for cooling of the semiconductor modules 62, the cooling means in the motor part 5 is not limited to fans or air passages, and may be any means.

The configurations presented in the embodiments above are examples of the present invention, which can be combined with other known technologies or can be partly omitted or modified without departing from the scope of the present invention.

REFERENCE SIGNS LIST 1 drive control device for electric vehicle; 2 inverter-integrated motor; 3 switch; 4 reactor; 5 motor part; 5a internal air passage; 5b external air passage; 5c inlet port; 5d exhaust port; 5e inner fan; 5f outer fan; 5g wall; 6 converter part; 7 truck; 6 housing; 9a pinion; 5b gear; 10 control signal cable; 11 motor conductor; 11u U-phase conductor; 11v V-phase conductor; 11w W-phase conductor; 12 direct-current connection conductor; 13 external connection conductor; 14 cable; 51 motor frame; 52 stator; 53 rotor; 54 motor shaft; 55 outer circumferential face; 56 fixed face; 57 semiconductor module attachment; 58 lead-out hole; 59 motor fixing member; 61 capacitor; 61a motor part side attaching face; 61b capacitor side terminal face; 61c external connection terminal; 61d capacitor side connection terminal; 62, 62A semiconductor module; 62a radiating surface; 62b module side terminal face; 62c direct-current side terminal; 62d alternating-current side terminal; 62e semiconductor element; 63 drive control board; 64 cover; 65 capacitor fixing member; 66 detector for motor; 71 wheel; 72 axle; 73 truck frame; 74 support frame; 100 electric vehicle.

The invention claimed is:

1. A drive control device for electric vehicle, the drive control device comprising:
a motor part; and a converter part to control driving of the motor part, wherein
the motor part includes a motor frame made of metal and accommodating a stator and a rotor,
the motor frame has an outer circumferential face,
the converter part is disposed around the motor frame,
the converter part includes a semiconductor module including a semiconductor element,
the semiconductor module is directly or thermally in contact with the outer circumferential face of the motor frame,
the outer circumferential face of the motor frame includes a fixing face to be fixed to a truck,
the converter part is disposed in an area of the outer circumferential face of the motor frame avoiding the fixing face,
the converter part includes a capacitor connected with the semiconductor module, and
the capacitor is formed in a shape following the outer circumferential face of the motor frame, and attached to the outer circumferential face of the motor frame.

2. The drive control device for electric vehicle according to claim 1, wherein the semiconductor element is an element having a junction temperature upper limit higher than temperature of the motor part heated.

3. The drive control device for electric vehicle according to claim 1, wherein the semiconductor element is formed of a wide band gap semiconductor.

4. The drive control device for electric vehicle according to claim 1, wherein
a semiconductor module attachment is formed integrally with the outer circumferential face of the motor frame, and
the semiconductor module is attached to the semiconductor module attachment.

5. The drive control device for electric vehicle according to claim 1, wherein
a semiconductor module attachment formed separately from the motor frame is fixed to the outer circumferential face of the motor frame, and
the semiconductor module is attached to the motor frame via the semiconductor module attachment.

6. The drive control device for electric vehicle according to claim 1, wherein
the semiconductor module further has a terminal face on which a connection terminal is provided, and a radiating surface to cool the semiconductor element, and
the semiconductor module is disposed on the outer circumferential face of the motor frame with the radiating surface facing the motor frame and the terminal face facing opposite to the motor frame.

7. The drive control device for electric vehicle according to claim 1, wherein
the converter part includes a detector to detect one of temperature, vibration, sound, partial discharge, and an insulating state of the motor part, and a drive control board to control driving of the semiconductor module, and
a signal from the detector is input to the drive control board.

8. The drive control device for electric vehicle according to claim 7, wherein the drive control board is disposed on a side opposite the motor frame across the semiconductor module.

9. The drive control device for electric vehicle according to claim 1, wherein
the capacitor is disposed on the outer circumferential face of the motor frame with a connection terminal of the capacitor facing the semiconductor module, and
the connection terminal of the capacitor and a connection terminal of the semiconductor module are connected with each other by a direct-current connection conductor that is parallel to the outer circumferential face of the motor frame.

10. The drive control device for electric vehicle according to claim 1, wherein the capacitor has an external connection terminal with which an external connection conductor is connected.

11. The drive control device for electric vehicle according to claim 1, wherein
the motor part is driven by three-phase AC power,
the drive control device further comprises a U-phase conductor, a V-phase conductor, and a W-phase conductor connecting the converter part and the motor part with each other,
the converter part includes, as the semiconductor module, a semiconductor module connected with the U-phase conductor, a semiconductor module connected with the V-phase conductor, and a semiconductor module connected with the W-phase conductor, and
the semiconductor modules are arranged in an axial direction of the motor part.

12. The drive control device for electric vehicle according to claim 1, wherein
the motor part is driven by three-phase AC power,
the drive control device further comprises a U-phase conductor, a V-phase conductor, and a W-phase conductor connecting the converter part and the motor part with each other,
the converter part includes, as the semiconductor module, a semiconductor module connected with the U-phase conductor, a semiconductor module connected with the V-phase conductor, and a semiconductor module connected with the W-phase conductor, and
the semiconductor modules are arranged in a circumferential direction of the motor part.

13. The drive control device for electric vehicle according to claim 1, wherein
the motor part is driven by three-phase AC power,
the drive control device further comprises a U-phase conductor, a V-phase conductor, and a W-phase conductor connecting the converter part and the motor part with each other,
the converter part includes, as the semiconductor module, a single semiconductor module connected with the U-phase conductor, the V-phase conductor, and the W-phase conductor,
the semiconductor module has a rectangular shape, and
the semiconductor module and the motor part are arranged so that a longitudinal direction of the semiconductor module is parallel to an axial direction of the motor part.

14. The drive control device for electric vehicle according to claim 6, wherein the connection terminal of the semiconductor module is connected with a stator of the motor part via a conductor.

15. The drive control device for electric vehicle according to claim 14, wherein
the motor frame has a lead-out hole through which the conductor is drawn out of the motor frame, and
the lead-out hole is at a position close to one side in an axial direction of the outer circumferential face of the motor frame.

16. The drive control device for electric vehicle according to claim 1, wherein
an external air passage to take external air into the motor part, circulate the external air, and then exhaust the external air out of the motor part is formed in the motor part, and
the semiconductor module and the external air passage are separated from each other by the motor frame.

17. A drive control device for electric vehicle, the drive control device comprising:
a motor part; and a converter part to control driving of the motor part, wherein
the motor part includes a motor frame made of metal and accommodating a stator and a rotor,
the motor frame has an outer circumferential face,
the converter part is disposed around the motor frame,
the converter part includes a semiconductor module including a semiconductor element,
the semiconductor module is directly or thermally in contact with the outer circumferential face of the motor frame,
the outer circumferential face of the motor frame includes a fixing face to be fixed to a truck,
the converter part is disposed in an area of the outer circumferential face of the motor frame avoiding the fixing face,
the motor part is driven by three-phase AC power,
the drive control device further comprises a U-phase conductor, a V-phase conductor, and a W-phase conductor connecting the converter part and the motor part with each other,
the converter part includes, as the semiconductor module, a semiconductor module connected with the U-phase conductor, a semiconductor module connected with the V-phase conductor, and a semiconductor module connected with the W-phase conductor, and
the semiconductor modules are arranged in an axial direction of the motor part.

18. A drive control device for electric vehicle, the drive control device comprising:
a motor part; and a converter part to control driving of the motor part, wherein
the motor part includes a motor frame made of metal and accommodating a stator and a rotor,
the motor frame has an outer circumferential face,
the converter part is disposed around the motor frame,
the converter part includes a semiconductor module including a semiconductor element,
the semiconductor module is directly or thermally in contact with the outer circumferential face of the motor frame,
the outer circumferential face of the motor frame includes a fixing face to be fixed to a truck,
the converter part is disposed in an area of the outer circumferential face of the motor frame avoiding the fixing face, the motor part is driven by three-phase AC power, the drive control device further comprises a U-phase conductor, a V-phase conductor, and a W-phase conductor connecting the converter part and the motor part with each other, the converter part includes, as the semiconductor module, a semiconductor module connected with the U-phase conductor, a semiconductor module connected with the V-phase conductor, and a semiconductor module connected with the W-phase conductor, and the semiconductor modules are arranged in a circumferential direction of the motor part.

19. A drive control device for electric vehicle, the drive control device comprising:

a motor part; and a converter part to control driving of the motor part, wherein the motor part includes a motor frame made of metal and accommodating a stator and a rotor, the motor frame has an outer circumferential face, the converter part is disposed around the motor frame, the converter part includes a semiconductor module including a semiconductor element, the semiconductor module is directly or thermally in contact with the outer circumferential face of the motor frame, the outer circumferential face of the motor frame includes a fixing face to be fixed to a truck, the converter part is disposed in an area of the outer circumferential face of the motor frame avoiding the fixing face, the motor part is driven by three-phase AC power, the drive control device further comprises a U-phase conductor, a V-phase conductor, and a W-phase conductor connecting the converter part and the motor part with each other, the converter part includes, as the semiconductor module, a single semiconductor module connected with the U-phase conductor, the V-phase conductor, and the W-phase conductor, the semiconductor module has a rectangular shape, and the semiconductor module and the motor part are arranged so that a longitudinal direction of the semiconductor module is parallel to an axial direction of the motor part.

* * * * *